April 20, 1926. Re. 16,327

H. B. IMES

LIFTING JACK

Original Filed June 28, 1920 2 Sheets-Sheet 1

Witnesses:
William P. Kilroy
Harry R. L. White

Inventor:
Harry B. Imes
By Hill & Hill
Attys

April 20, 1926.

Re. 16,327

H. B. IMES

LIFTING JACK

Original Filed June 28, 1920 2 Sheets-Sheet 2

Witnesses:
William P. Kilroy
Harry R. L. White

Inventor:
Harry B. Imes
By Hill & Hill
Attys

Reissued Apr. 20, 1926. Re. 16,327

UNITED STATES PATENT OFFICE.

HARRY B. IMES, OF CHICAGO, ILLINOIS, ASSIGNOR TO JOHN W. HILL, OF CHICAGO, ILLINOIS.

LIFTING JACK.

Original No. 1,409,861, dated March 14, 1922, Serial No. 392,191, filed June 28, 1920. Application for reissue filed November 7, 1925. Serial No. 67,701.

*To all whom it may concern:*

Be it known that I, HARRY B. IMES, a citizen of the United States, residing at Chicago, in the county of Cook and State of Illinois, have invented certain new and useful Improvements in Lifting Jacks, of which the following is a description.

My invention belongs to that general class of devices known as lifting jacks, and has for its object the production of such a device that will be effective and reliable in its operation, and which will improve and increase advantages over devices of this character heretofore available.

In the drawings, wherein like reference characters indicate like or corresponding parts, Figure 1 is a side elevation of the preferred form of my device;

Figure 1:
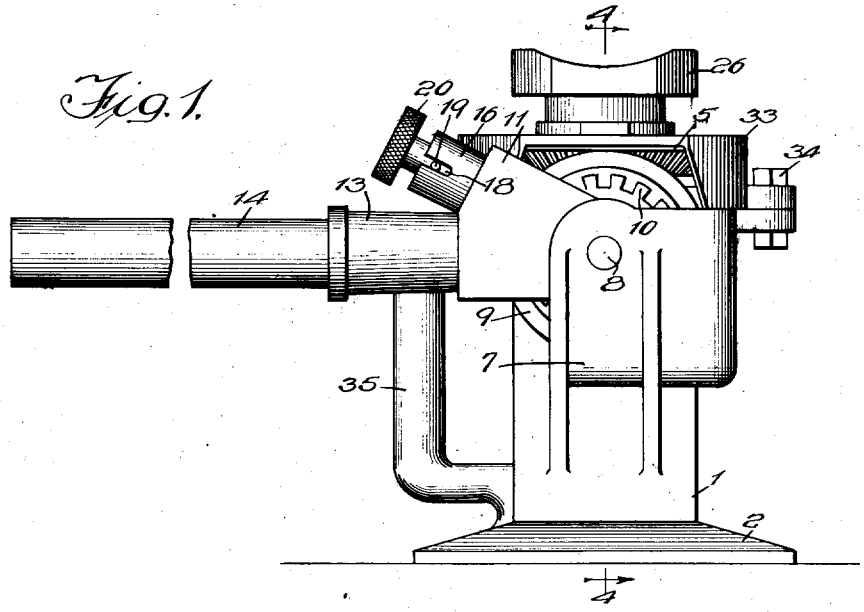
Figure 2:
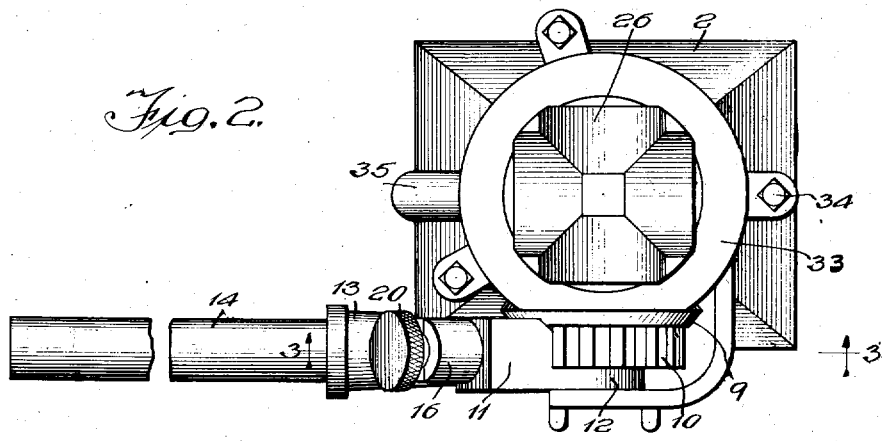
Figure 2 is a top plan view of the same.

In the drawings showing the preferred embodiment of my device, 1 represents a supporting column provided with a suitable base 2 and formed with a cylindrical opening extending longitudinally therein as at 3.

Figure 4:
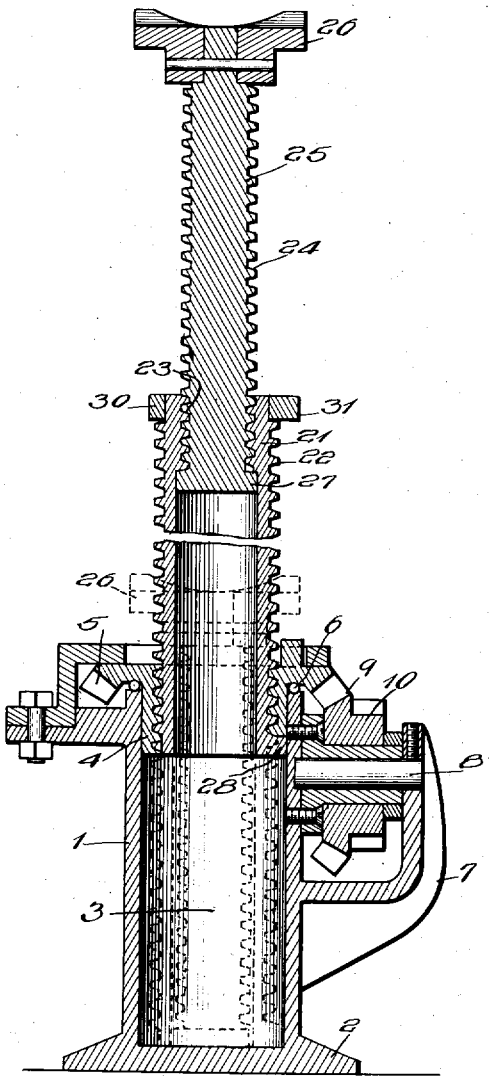
Figure 4 is a vertical sectional view on line 4—4 of Figure 1, showing the jack extended to substantially its limit of movement.
Figure 5:
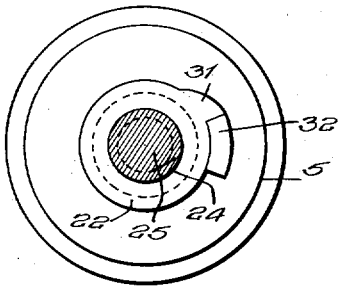
Figure 5 is a top plan view of a rotatable sleeve supported upon the standard.
Figure 6:
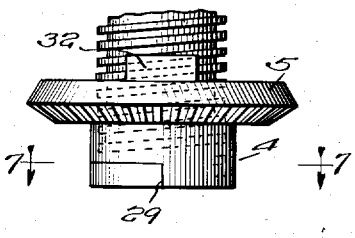
Figure 6 is an edge view of the same showing a part of the cooperating threaded sleeve.
Figure 7:
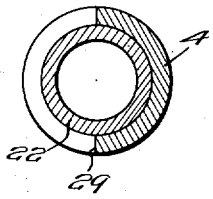
Figure 7 is a cross sectional view substantially on line 7—7 of Figure 6.

A collar 4 formed to be loosely positioned within the cylindrical opening 3, carries upon its upper end a transversely extending beveled gear member 5, which is adapted to rest upon the upper end of the base 1 in such manner as to be freely rotated thereon. As shown in Figure 4, ball bearing 6 or equivalent friction reducing members may be interposed between the member 5 and the upper end of the standard. The collar 4 is internally screw-threaded, as indicated in Figures 4 and 6, for a purpose which will be hereafter described.

A bracket 7 is carried by the standard 1, provided with a shaft 8 extending from the bracket to the body of the standard, upon which is mounted the cooperating beveled gear 9 arranged to engage the gear 5. Any preferred means may be employed to enable the gear 9 to be readily rotated so as to rotate the gear 5 and its collar 4. As shown, the gear 9 has formed integrally therewith a cog-wheel 10, forming a ratchet to cooperate with a suitable pawl carried by an operating lever. 11 is a pawl lever provided with an extension 12 loosely mounted on the shaft 8 and extended as at 13 to receive a suitable operating handle 14. 15 is a spring pawl longitudinally movable in an extension 16 and maintained in its operative position by a spring 17. The extension 16 in the simple form shown has formed in its upper edge a transverse slot 18, in which may be positioned a transverse pin 19 carried on the spring pawl. The pawl has upon its upper end a head piece 20. By pulling the pawl outward, it will be freed from its engagement with the ratchet 10, and it may be rotated to bring its chisel point in the opposite direction, whereupon the reciprocation of the handle will cause the collar to rotate in the opposite direction. By this means the handle may be reciprocated to rotate the collar 4 to secure the lifting effect, or when it is desired to release the jack, by operating the pawl as described, lowering the lifting bar and tending to release the jack.

In the preferred form illustrated, the lifting bar is telescopically formed, providing a plurality of members arranged to engage one another to secure that effect. 21 is a sleeve screw-threaded on its exterior as at 22 to engage the interior threads on the collar 4, and screw-threaded upon its interior as at 23 a sufficient distance to provide secure engagement with the screw-threads 24 upon the exterior of the cooperating supplemental lifting bar 25, the threads 22 and 24 extending in the same direction. The upper end of the supplemental bar 25 is provided with an engaging plate 26, or its equivalent, arranged to contact with the body to be lifted.

The engaging plate 26 is removable from the bar 25, allowing the latter to be placed in threaded engagement with the sleeve 21 from the bottom of the latter, the bar 25 being provided with an enlarged section 27 or with an equivalent arrangement so as to limit the upward movement of the bar and prevent its disengagement from the top of the sleeve 21. The lifting sleeve 21 is likewise engaged with the collar 5 from the bottom thereof. At the bottom it terminates in an extending shoulder 28, which as the sleeve reaches its upward limit of movement contacts with and engages a shoulder 29 on the collar 4, thus stopping the rotation of the sleeve and preventing its accidental disengagement. A collar 30 is secured upon the upper end of the sleeve 21 in any preferred manner, and provided with an extending stop 31 which, as the sleeve reaches its lower limit of movement, engages with the stop 32 carried upon the upper face of the member 5, thus limiting rotation in that direction. A cap piece 33 is adapted to be placed over the upper end of the telescoping parts, and is provided with a central opening through which those parts may extend. The cap piece is secured to the base in any preferred manner, for illustration, by means of bolts 34.

Figure 3:
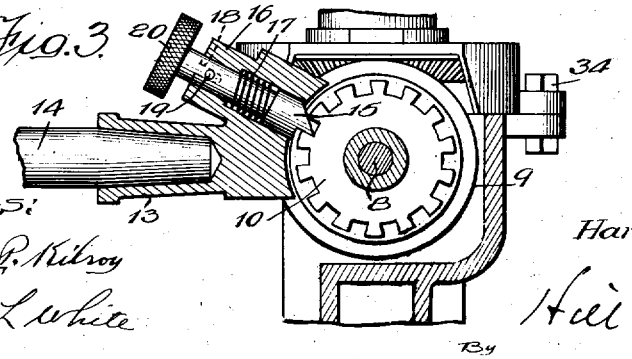
Figure 3 is a vertical sectional view on line 3—3 of Figure 2.

Assuming that the tool is in the position shown in Fig. 3, the reciprocation of the lever 14 will rotate the integral pivotal gear and collar to the right. Bearing in mind that the bar 25 is held non-rotative by its engagement with the load to be lifted, or by other means, until it is placed against said load, it is obvious that the rotation of the gear 5 will also rotate the sleeve 21, because there is nothing to hold said sleeve from such rotation, and further, the friction between the sleeve and gear at the cooperating threads, which is induced by the load, increases the tendency of the gear and sleeve to rotate as one.

Therefore, the gear and sleeve act together as a nut, considering the bar 25 as the bolt. It is a well known mechanical law that when a bolt is held non-rotative and the nut is kept from sliding but is freely rotatable, then any rotation of the nut causes the bolt to move axially. In the same manner the rotation of the gear and sleeve as a nut causes the bar 25 to be moved axially until the enlarged end 27 wedges against or abuts the lower thread 23, limiting the independent movement of the sleeve and bar. Then the sleeve 21 changes in its action from a nut to a bolt and forms in effect an extension of the bar 25, because although the gear 5 still tends to rotate the sleeve 21, such rotation would be in a direction relatively downward of the lower end of the bar 25 and as such movement is prevented by the enlargement 27, the sleeve can only move axially with the bar 25. Therefore, the continued rotation of the gear 5 in the same direction causes the sleeve and bar to lift as one, as said gear is held against axial movement by the cap 33 and acts as a nut. This will continue until the sleeve reaches the limit of its movement and the extension 28 engages with the shoulder 29, locking the parts together and preventing any further rotation of the collar. This makes the limit of movement of the lifting elements of the jack.

Pulling the pawl outward and turning it one-half rotation will bring it in the reverse engagement with the cog-rack or ratchet 10. The reciprocation of the lever will then cause the reverse movement of the parts just described, and they will assume their original position.

35 is simply a handle formed integrally with the standard for convenience in handling the device.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

I claim as my invention:

1. In a lifting jack adapted to contact with the body of an automobile to be lifted, and in combination, a supporting base formed with a vertically extending cylindrical opening in the center, an internally threaded collar rotatably supported upon the upper end of the base, a cooperating sleeve member externally threaded to engage with the thread in the collar and internally threaded to engage a telescoping supplemental lifting bar member, a supplemental lifting bar member externally threaded to engage said sleeve member, means for rotating said collar, and said parts carrying operatively associated means whereby to automatically effect successive axial movements of said members relative to said collar.

2. In a lifting jack for automobiles and in combination, a supporting base formed with a vertically extending opening therein, a sleeve member internally threaded to engage a telescoping supplemental lifting bar member, a supplemental lifting bar member disposed within said sleeve member and externally threaded to engage said sleeve member, said supplemental lifting bar member having at its upper end an engaging plate to contact with the body to be lifted, means for automatically effecting successive axial movements of said members relative to the base, said means comprising a collar rotatably supported upon the base, and cooperating external and internal threads carried by said sleeve and said collar respectively, means for rotating said collar, and movement limiting means for said sleeve and supplemental lifting bar member mounted upon said parts.

3. A lifting jack adapted for use beneath automobiles to elevate the same, comprising a vertically disposed supporting base formed with a longitudinally extending opening therein, an internally threaded collar rotatably supported upon the upper end of the base, a cooperating sleeve member externally threaded to engage with the thread in the collar and internally threaded to engage a telescoping supplemental lifting bar member, a supplemental lifting bar member externally threaded to engage said sleeve member, and means controlled by the lifting members for automatically effecting successive axial movements thereof.

4. A lifting jack adapted for use underneath automobiles to elevate the same, comprising a supporting base formed with a vertically extending passage therein, a sleeve member externally threaded adapted to engage with the thread in a collar and internally threaded to engage a telescoping supplemental lifting bar member, a supplemental lifting bar member externally threaded to engage said sleeve member, said supplemental lifting bar member having a provision upon its upper end adapted to engage the load, means for automatically effecting successive elevation of said members, one at a time, said means comprising a collar rotatably supported upon the base and internally threaded to engage with the externally threaded portion of said sleeve member, and provisions for preventing disengagement of said members and said collar during upward elevational movement of said members, and means for rotating said collar.

5. A lifting jack for automobiles, comprising a vertically disposed supporting base formed with an elongated vertically extending opening therein, a collar rotatably supported upon the base, nested cooperating sleeve and lifting bar members mounted in the collar, connections between said members and said collar whereby said members are automatically and successively elevated, one at a time, when the collar is continuously rotated in one direction, said lifting bar member having at its upper end a part to engage the load above the collar, and means for rotating said collar.

6. A lifting jack for automobiles, comprising a supporting base formed with a vertically extending cylindrical opening therein, an internally threaded collar rotatably supported within said opening and having a part loosely resting upon the upper end of the base, a cooperating sleeve member externally threaded to engage with the thread in the collar and internally threaded to engage a telescoping supplemental lifting bar member, a supplemental lifting bar member externally threaded to engage said sleeve member, a load-engaging plate carried by the lifting part to contact with the load above the collar, and movement limiting means controlled in accordance with the position of the lifting members themselves for automatically effecting successive axial movements thereof.

7. A lifting jack adapted for use underneath automobiles to elevate the same, comprising a standard provided with a vertically extending opening, a sleeve member threaded upon the exterior to engage a nut and internally threaded to engage a supplemental lifting bar, a supplemental lifting bar externally threaded to engage the sleeve, a rotatable nut non-tiltably supported by the standard engaging the external threads of the sleeve, means for rotating the nut in either direction at will, said lifting bar having at its upper end a plate shaped to engage the load to be lifted above the nut, and stopping means arranged to limit the movement of the sleeve in relation to the nut, and auxiliary stopping means arranged to limit the movement of the lifting bar in relation to the sleeve member.

8. A lifting device adapted to be placed underneath automobiles to elevate the same, comprising a supporting base formed with a vertically extending opening therein, a nut member non-tiltably and rotatably supported by the base, and means for rotating the nut member in either direction at will, in combination with an elevating sleeve externally threaded to engage the nut member and internally threaded to engage a cooperating elevating member, a cooperating elevating member threaded to engage the internal threads of the sleeve, said cooperating elevating member having a lifting plate to engage beneath the load above the nut, and stopping means arranged to limit the movement of the sleeve in relation to the nut member, and stopping means arranged to limit the movement of the cooperating member in relation to the sleeve member, whereby upon rotating the nut member in one direction one of the elevating members will be elevated to the limit of its movement and thereafter the other elevating member will be automatically elevated to the limit of its movement, and thereafter rotating the nut in the reverse direction will return the elevating members to their original position.

9. A lifting jack comprising, a supporting base formed with a vertically extending opening therein, an internally threaded collar rotatably supported upon the base, means for rotating said collar, a cooperating sleeve member externally threaded to engage with the thread in the collar and internally threaded to engage a telescoping supplemental lifting bar member, a supplemental lifting bar externally threaded to engage said sleeve said lifting bar having provisions at its upper end for engaging the load, and cooperating means carried by the threaded collar and the sleeve for preventing rotation of the outer sleeve in one direction only relative to the collar when at the upper limit of its travel.

10. A lifting jack comprising, a supporting base formed with a vertically extending opening therein, an internally threaded collar rotatably supported upon the base, means for rotating said collar, a cooperating sleeve member externally threaded to engage with the thread in the collar and internally threaded to engage a telescoping supplemental lifting bar member, a supplemental lifting bar externally threaded to engage said sleeve said lifting bar having provisions at its upper end for engaging the load, and cooperating means carried by the threaded collar and the sleeve for preventing rotation of the outer sleeve in one direction only relative to the collar when at either limit of its travel.

11. A lifting jack comprising, a supporting base formed with a vertically extending opening therein, an internally threaded collar rotatably supported upon the base, means for rotating said collar, a cooperating sleeve member externally threaded to engage with the thread in the collar and internally threaded to engage a telescoping supplemental lifting bar member, a supplemental lifting bar externally threaded to engage said sleeve said lifting bar having provisions at its upper end for engaging the load, and means for automatically causing successive elevation of said members, comprising means controlled by a position of one of said members for preventing rotation thereof relative to said collar.

12. A lifting jack comprising, a supporting base formed with a vertically extending opening therein, an internally threaded collar rotatably supported upon the base, means for rotating said collar, a cooperating sleeve member externally threaded to engage with the thread in the collar and internally threaded to engage a telescoping supplemental lifting bar member, a supplemental lifting bar externally threaded to engage said sleeve said lifting bar having provisions at its upper end for engaging the load, and automatic means for causing successive extension and retraction of said members, one of said members being moved in advance of the other during both extension and retraction of the jack.

13. A lifting jack comprising, a supporting base formed with a vertically extending opening therein, and internally threaded collar rotatably supported upon the base, means for rotating said collar, a cooperating sleeve member externally threaded to engage with the thread in the collar and internally threaded to engage a telescoping supplemental lifting bar member, a supplemental lifting bar externally threaded to engage said sleeve said lifting bar having provisions at its upper end for engaging the load, and automatic means for causing successive axial movement of said members, one of said members moving axially in advance of the other during extension of the jack, and said same member moving in advance of the other during retraction of the jack.

14. A lifting jack for automobiles, comprising an upright supporting base or standard formed with an elongated vertically extending opening therein, an internally threaded collar loosely positioned in said opening for rotatable movement and having a part supported upon the upper end of said base, means for rotating said collar, a cooperating sleeve member externally threaded to engage with the thread in the collar and internally threaded to engage a telescoping supplemental lifting bar, a supplemental lifting bar externally threaded to engage said sleeve and having at its upper end provisions to directly engage the load thereabove, and means carried by said parts automatically brought into play at the upper limit of travel of said outer sleeve for positively preventing rotation of the same in one direction.

HARRY B. IMES.